(12) United States Patent
Mravik

(10) Patent No.: US 11,530,127 B2
(45) Date of Patent: Dec. 20, 2022

(54) FLUID DISPENSER

(71) Applicant: Richard Mravik, Courtenay (CA)

(72) Inventor: Richard Mravik, Courtenay (CA)

( * ) Notice: Subject to any disclaimer, the term of this patent is extended or adjusted under 35 U.S.C. 154(b) by 41 days.

(21) Appl. No.: 17/324,351

(22) Filed: May 19, 2021

(65) Prior Publication Data
US 2022/0002140 A1    Jan. 6, 2022

Related U.S. Application Data

(60) Provisional application No. 63/047,653, filed on Jul. 2, 2020.

(51) Int. Cl.
*B67D 3/00* (2006.01)
*A01K 39/02* (2006.01)
*A01K 7/00* (2006.01)

(52) U.S. Cl.
CPC .............. *B67D 3/0061* (2013.01); *A01K 7/00* (2013.01); *A01K 39/02* (2013.01); *B67D 3/0032* (2013.01); *B67D 3/0038* (2013.01); *B67D 3/0067* (2013.01); *B67D 2210/0001* (2013.01)

(58) Field of Classification Search
CPC .............. B67D 3/0061; B67D 3/0032; B67D 2210/0001; B67D 3/0067; B67D 3/0038; A01K 7/00; A01K 39/02
See application file for complete search history.

(56) References Cited

U.S. PATENT DOCUMENTS

| | | | | |
|---|---|---|---|---|
| 662,990 | A * | 12/1900 | Thornburgh | A01K 39/026 137/614.13 |
| 1,520,133 | A * | 12/1924 | Mcarthur | A01K 7/04 119/77 |
| 1,574,755 | A * | 3/1926 | Peterson | A01K 7/04 119/78 |
| 4,240,570 | A * | 12/1980 | Brown | G01F 11/38 222/453 |
| 4,582,230 | A * | 4/1986 | Vierkotter | G01F 11/263 222/453 |
| 4,773,569 | A * | 9/1988 | Larsson | B67D 7/0216 222/476 |
| 4,946,075 | A * | 8/1990 | Lundback | B67D 1/0001 222/476 |
| 5,044,527 | A * | 9/1991 | Hickerson | G01F 11/263 222/456 |
| 5,524,795 | A * | 6/1996 | Lee | B65D 47/2068 222/207 |
| 5,601,212 | A * | 2/1997 | Lee | G01F 11/32 222/207 |
| 6,145,473 | A * | 11/2000 | Keisner | A01K 7/02 119/53 |
| 6,311,877 | B1 * | 11/2001 | Yang | B65D 51/1683 222/481.5 |
| 6,547,103 | B1 * | 4/2003 | Elliott | B67D 3/0022 141/351 |
| 6,648,184 | B1 * | 11/2003 | Williams | B67D 3/0032 222/487 |

(Continued)

*Primary Examiner* — Frederick C Nicolas
(74) *Attorney, Agent, or Firm* — William J. Bundren

(57) ABSTRACT

A fluid dispenser for use for birds and animals and for use to purify water for human consumption is described, the dispenser having a fluid container and a valve rod that move relative to each other to open and close valves to an inlet funnel at an upper end of the dispenser and to a fluid reservoir at a lower end of the dispenser.

20 Claims, 16 Drawing Sheets

(56) References Cited

U.S. PATENT DOCUMENTS

| | | | |
|---|---|---|---|
| 8,220,666 B2 * | 7/2012 | Abe | B05B 11/3045 222/207 |
| 2004/0134932 A1 * | 7/2004 | Lobdell | B67D 3/0029 222/189.06 |
| 2007/0164058 A1 * | 7/2007 | Burkovskiy | B67D 3/0061 222/566 |
| 2007/0277738 A1 * | 12/2007 | Dentsbier | A01K 7/02 119/77 |
| 2011/0011345 A1 * | 1/2011 | LoRocco | A01K 39/02 119/72 |

* cited by examiner

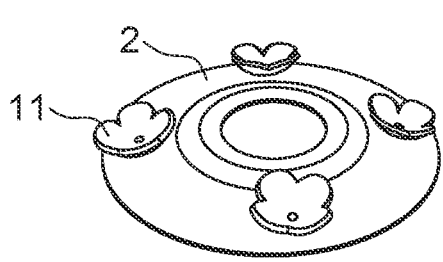
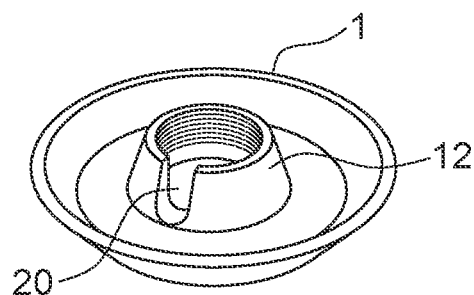
FIG. 2　　　　FIG. 3
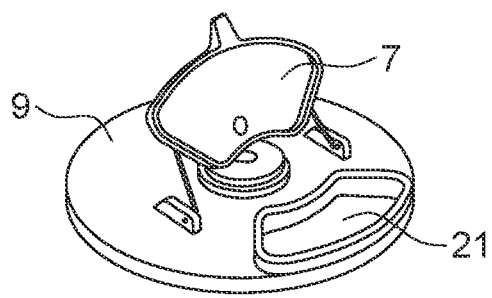
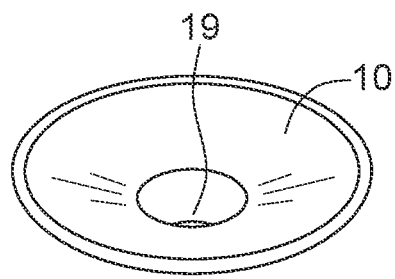
FIG. 4　　　　FIG. 5
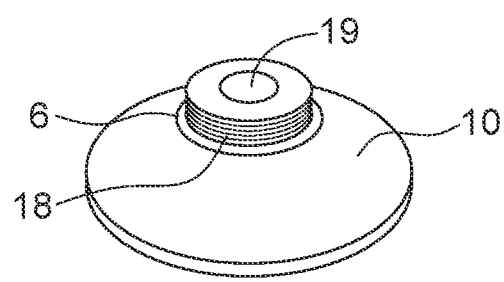
FIG. 6

FLUID DISPENSER

CROSS-REFERENCE TO RELATED APPLICATIONS

This application claims priority of U.S. provisional patent application Ser. No. 63/047,653 filed Jul. 2, 2020, which is incorporated by reference into this application in its entirety.

TECHNICAL FIELD

The present disclosure is related to the field of dispensers for fluids, in particular, dispensers for liquids or water for animals and birds, and of fluid dispensers for use for purifying water for human consumption.

BACKGROUND

Bird feeders, such as for hummingbirds, can be awkward and messy to refill.

It is, therefore, desirable to provide a fluid dispensing device that can be used as a bird feeder or as a water dispenser for birds or animals that is easy to fill and operate.

SUMMARY

Broadly stated, in some embodiments, a fluid dispenser can be provided, comprising: a fluid container comprising an upper opening and a lower opening; an upper valve seat disposed in the fluid container adjacent the upper opening; a lower valve seat disposed in the fluid container adjacent the lower opening, wherein the upper and lower valve seats are disposed a first predetermined distance apart; a valve rod disposed in the fluid container, the valve rod comprising an upper valve stopper disposed thereon, the upper valve stopper configured to seat in the upper valve seat, and wherein the valve rod further comprises a lower valve stopper disposed thereon, the lower valve stopper configured to seat in the lower valve seat, wherein the upper and lower valve stoppers are disposed a second predetermined distance apart, and wherein the second predetermined distance is less than the first predetermined distance; a reservoir operatively coupled to the lower opening of the fluid container; and wherein raising the valve rod relative to the fluid container, or lowering the fluid container relative to the valve rod, causes the upper valve stopper to seat in the upper valve seat, and when lowering the valve rod relative to the fluid container, or raising the fluid container relative to the valve rod, causes the lower valve stopper to seat in the lower valve seat.

Broadly stated, in some embodiments, the fluid dispenser can further comprise an inlet funnel operatively coupled to the upper opening, the inlet funnel further comprising the upper valve seat.

Broadly stated, in some embodiments, the inlet funnel can be threadably coupled to the fluid container.

Broadly stated, in some embodiments, the fluid dispenser can further comprise an inlet funnel cover disposed on the inlet funnel, the inlet funnel cover further comprising a inlet port disposed therethrough and a flap hingeably attached to the inlet funnel cover, the flap configured to cover the inlet port and to lift up to provide access to the inlet port.

Broadly stated, in some embodiments, the fluid dispenser can further comprise a dust cover hingeably attached to the inlet funnel.

Broadly stated, in some embodiments, the fluid dispenser can further comprise a control mechanism configured to move the valve rod between a first position where the upper valve stopper is seated in the upper valve seat and a second position where the lower valve stopper is seated in the lower valve seat.

Broadly stated, in some embodiments, wherein the fluid dispenser can be further configured for the reservoir to be threadably attached to the fluid container, the reservoir further configured for communication with the fluid container.

Broadly stated, in some embodiments, the fluid dispenser can further comprise a reservoir cover configured to cover the reservoir, the reservoir configured to be retained in place when the reservoir is threadably attached to the fluid container, the reservoir cover further comprising at least one aperture disposed therethrough to provide access to the reservoir by an animal or a bird.

Broadly stated, in some embodiments, the valve rod can further comprise a hook disposed on an upper end thereof.

Broadly stated, in some embodiments, the valve rod can further comprise a cover slidably attached thereto, the cover configured to cover the inlet funnel.

Broadly stated, in some embodiments, the cover can further comprise an ant barrier.

Broadly stated, in some embodiments, the reservoir can comprise a valve rod stem, wherein the valve rod is operatively coupled to the valve rod stem, and wherein the fluid container is slidably disposed on the valve rod stem, the valve rod stem configured to provide communication between the fluid container and the reservoir.

Broadly stated, in some embodiments, the fluid dispenser can further comprise a lift mechanism configured to move the fluid container between a first position where the upper valve stopper is seated in the upper valve seat and a second position where the lower valve stopper is seated in the lower valve seat.

Broadly stated, in some embodiments, the lift mechanism can further comprise a lifting arm operatively coupled to an eccentric wheel configured to raise and lower the fluid container on the valve rod stem when the lifting arm is raised and lowered.

Broadly stated, in some embodiments, the fluid dispenser can further comprise a dust cover hingeably attached to the inlet funnel.

Broadly stated, in some embodiments, the reservoir can further comprise a filtration container.

Broadly stated, in some embodiments, the filtration container can comprise: an outer holding container comprising an upper edge; an inner holding container configured to be disposed within the outer holding container, the inner holding container comprising a flange configured to be disposed on top of the upper edge; at least one water filter disposed in the inner holding container, the at least one water filter configured to provide fluid communication from the inner holding container to the outer holding container; and a lid configured to be disposed on top of the flange, the lid further configured to operatively couple to the lower opening of the fluid container.

Broadly stated, in some embodiments, the at least one water filter can comprise a charcoal water filter.

Broadly stated, in some embodiments, the at least one water filter can be configured can be releasably attached to the inner holding container.

Broadly stated, in some embodiments, the fluid dispenser can further comprise a water spout operatively coupled to the outer holding container, the water spout configured to provide fluid communication to the outer holding container.

BRIEF DESCRIPTION OF THE DRAWINGS

FIG. 2 is a perspective view depicting a reservoir cover for the fluid dispenser of FIG. 1.

FIG. 3 is a perspective view depicting a reservoir for the fluid dispenser of FIG. 1.

FIG. 4 is a perspective view depicting an inlet funnel cover for the fluid dispenser of FIG. 1.

FIG. 5 is a perspective view depicting an inlet funnel for the fluid dispenser of FIG. 1.

FIG. 6 is a perspective view depicting the bottom side of the inlet funnel of FIG. 5.

DETAILED DESCRIPTION OF EMBODIMENTS

Figure 1:
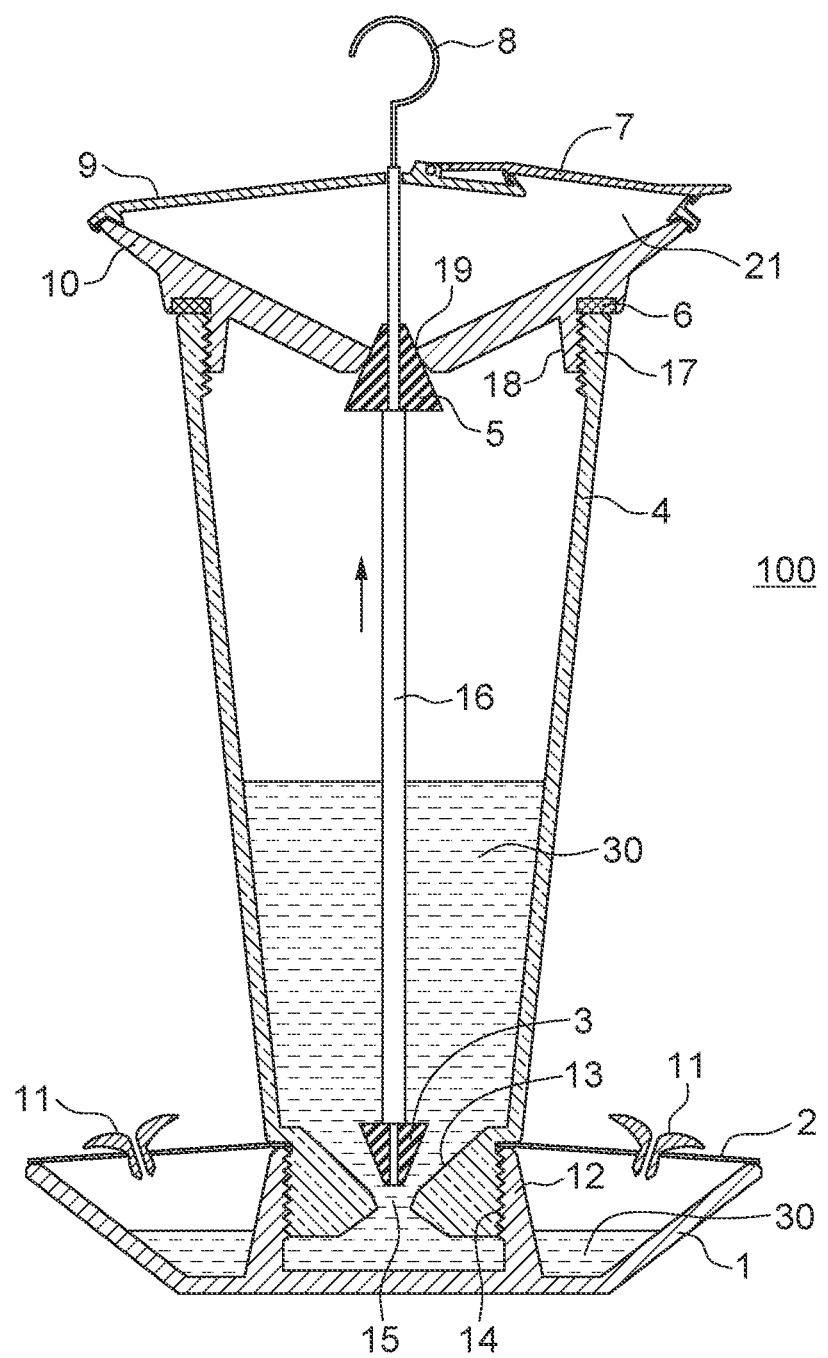
FIG. 1 is a side elevation cross-section view depicting one embodiment of a fluid dispenser.
Figure 7:
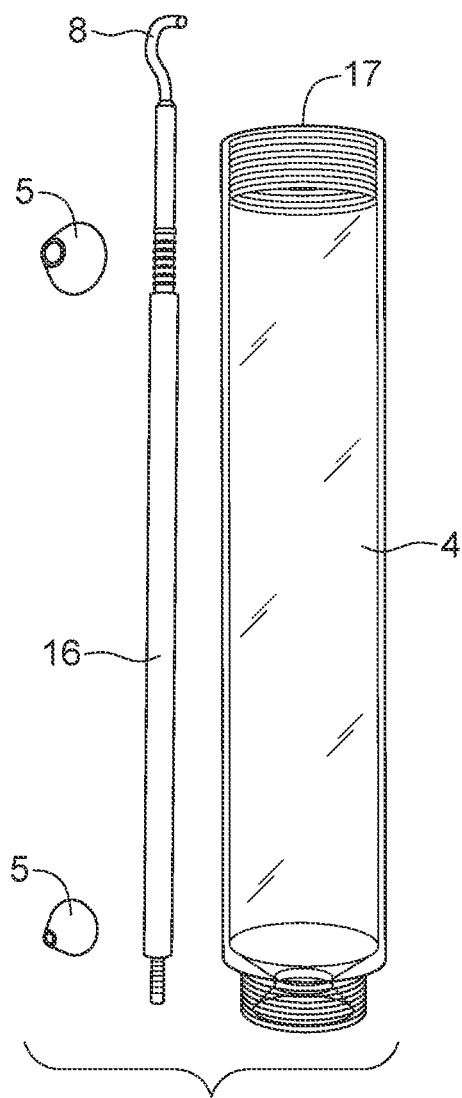
FIG. 7 is an elevation view depicting a fluid container and a valve rod for the fluid dispenser of FIG. 1.
Figure 8:
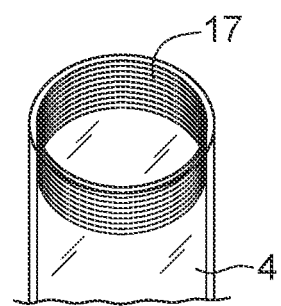
FIG. 8 is a perspective view depicting a top end of the fluid container of FIG. 7.
Figure 9:
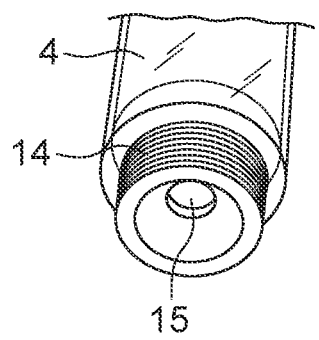
FIG. 9 is a perspective view depicting a bottom end of the fluid container of FIG. 7.

In this description, references to "one embodiment", "an embodiment", or "embodiments" mean that the feature or features being referred to are included in at least one embodiment of the technology. Separate references to "one embodiment", "an embodiment", or "embodiments" in this description do not necessarily refer to the same embodiment and are also not mutually exclusive unless so stated and/or except as will be readily apparent to those skilled in the art from the description. For example, a feature, structure, act, etc. described in one embodiment can also be included in other embodiments but is not necessarily included. Thus, the present technology can include a variety of combinations and/or integrations of the embodiments described herein.

A fluid dispenser is provided. In some embodiments, the fluid dispenser can be configured as a liquid feed dispenser for birds, such as for hummingbirds. In some embodiments, the fluid dispenser can be configured as a water dispenser for birds. In some embodiments, the fluid dispenser can be configured as a water dispenser for small animals or pets, such as cats and dogs. In all embodiments, the fluid dispenser can comprise a fluid container having a substantially vertical valve rod disposed therein with valve stoppers disposed on upper and lower ends of the valve rod, wherein the valve rod can be moved upwards relative to the fluid container such that the upper valve stopper seats against an upper valve seat to close off communication into the fluid container and such that fluid in the fluid container can exit through a lower valve seat disposed below the lower valve stopper. The valve rod can also be moved downwards relative to the fluid container such that the lower valve stopper can seat against the lower valve seat to close off any flow of fluid therethrough and such the upper valve stopper moves away from the upper valve seat thereby allowing new fluid to pass therethrough to fill the fluid container.

Referring to FIGS. 1 to 11, one embodiment of fluid dispenser 100 is shown. In some embodiments, fluid dispenser 100 can comprise fluid container 4 for holding fluid 30, wherein fluid container 4 can comprise threaded coupling 17 disposed around an upper end thereof and configured to threadably couple to threaded coupling 18 disposed on inlet funnel 10 wherein inlet funnel slopes downward towards upper valve seat 19 disposed substantially in the centre of inlet funnel 10, upper valve seat 19 defining an upper opening disposed therethrough. In this configuration, upper valve seat 19 and lower valve seat 13 can be vertically spaced apart by a first pre-determined distance.

In some embodiments, fluid container 4 can comprise threaded coupler 14 disposed at a lower end thereof, threaded coupler 14 configured to threadably couple to reservoir coupler 12 of reservoir 1. Threaded coupler 14 can further comprise lower valve seat 13 that further defines lower opening 15 disposed therethrough. In some embodiments, reservoir coupler 12 can comprise slot opening 20 that enables fluid communications from the interior of fluid container 4 through opening 15 and slot opening 20 into reservoir 1 to allow fluid 30 to flow therein. In some embodiments, reservoir cover 2 can comprise a disk-type configuration with a central opening disposed therethrough such that reservoir cover 2 can be disposed and retained between reservoir 1 and fluid container 4 when threaded coupler 14 is threaded into reservoir coupler 12. In some embodiments, reservoir cover 12 can comprise one or more feeder ports 11 disposed thereon to allow a bird to insert their beak therethrough to access fluid in reservoir 1.

In some embodiments, inlet funnel 10 can comprise threaded coupling 18 disposed on a bottom side thereof that can be configured to threadably couple with threaded coupling 17 of fluid container 4. In some embodiments, ring seal 6 can be disposed between inlet funnel 10 and fluid container 4 when the two are threaded together to provide a leak-proof seal therebetween. In some embodiments, inlet funnel cover 9 can be disposed on top of inlet funnel 10 to prevent ingress thereto by insects and the like. Inlet funnel cover 9 can further comprise inlet port 21 disposed therethrough and flap cover 7 configured to open and close on top of inlet port 21.

In some embodiments, fluid dispenser 100 can comprise valve rod 16 further comprising upper valve stopper 5 disposed near an upper end thereof and lower valve stopper 3 disposed near a lower end thereof. Valve rod 16 can further comprise hook 8 at an uppermost end thereof. In some embodiments, upper valve stopper 5 and lower valve stopper 3 can be spaced apart on valve rod 16 a second predetermined distance apart, where the second predetermined distance is less than the first predetermined distance.

Figure 10:
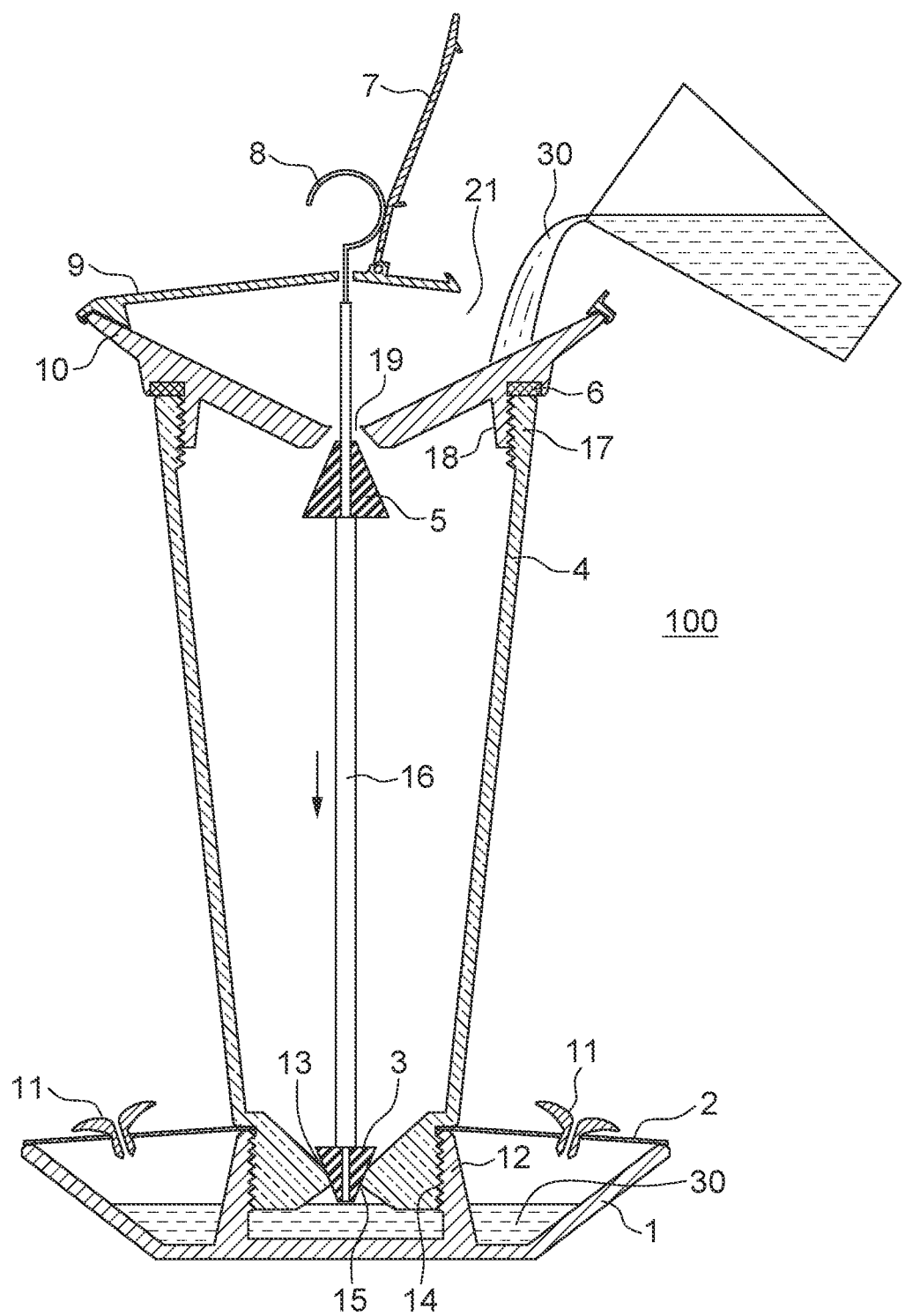
FIG. 10 is a side elevation cross-section view depicting the fluid dispenser of FIG. 1 being filled with fluid.
Figure 11:
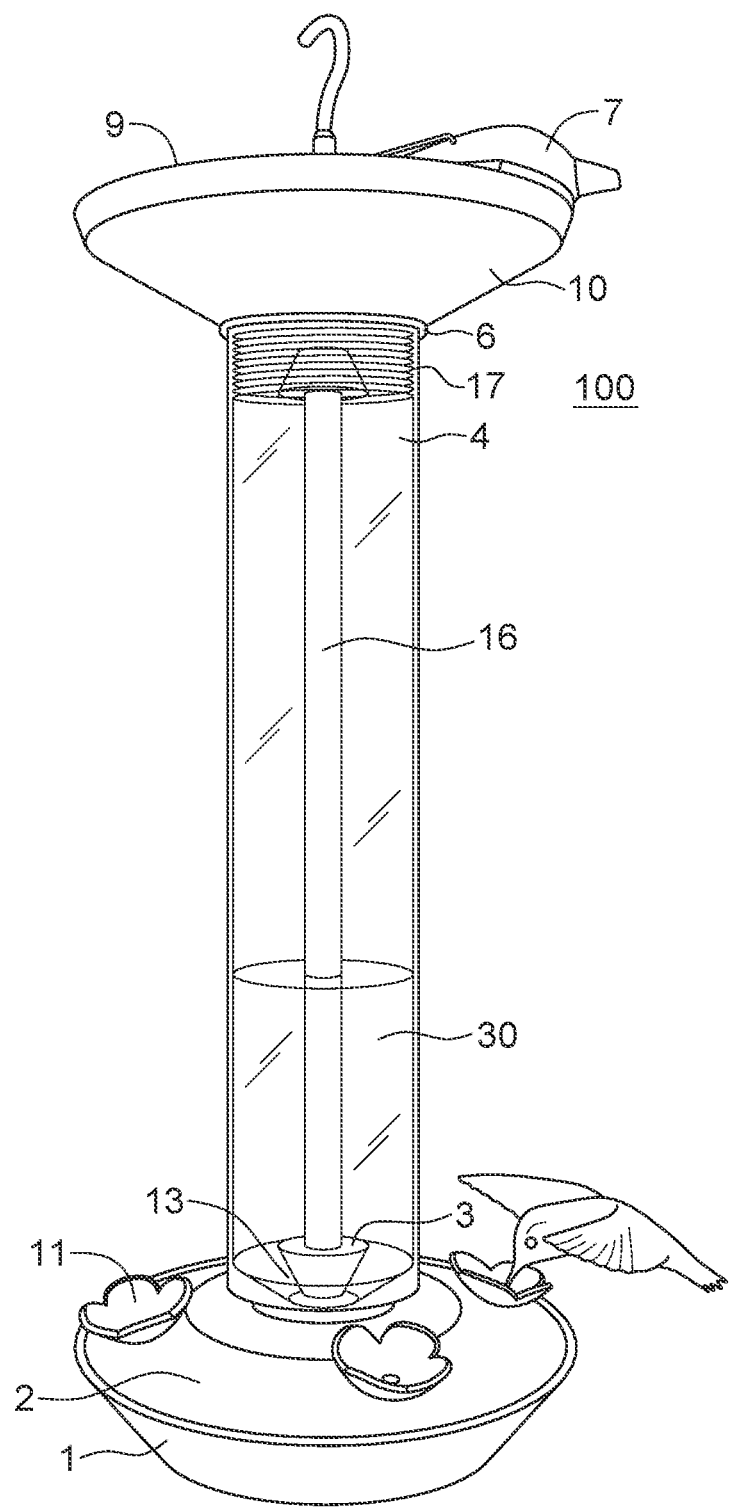
FIG. 11 is a photograph of the fluid dispenser of FIG. 1 providing liquid feed to a hummingbird.

Referring to FIG. 1, fluid container 100 can be hung from a tree branch or hook bracket mounted on a wall or fence by hook 8 attached thereto. In this configuration, fluid container 4 is drawn downwards by gravity wherein upper valve seat 19 can rest on upper valve stopper 5 such that lower valve stopper 3 is not seated on lower valve seat 13 thereby allowing fluid 30 in fluid container 4 to flow downward into reservoir 1 where birds can access the fluid through feeder ports 11. Referring to FIG. 10, when fluid is to be added to fluid dispenser 100, fluid container 4 can be lifted up or removed completely from its mounting hook thereby causing gravity to draw valve rod 16 downwards causing lower valve stopper 3 to seat in lower valve seat 13 to close off flow of fluid 30 from fluid container 4 to reservoir 1. This also causes upper valve stopper 5 to move downwards away from upper valve seat 19. Fluid 30 can then be added to fluid dispenser 100 by opening flap 7 and pouring fluid 30 through inlet port 21 so that it can flow down through inlet funnel 10 and pass through upper valve seat 19 to enter fluid container 4. Once filled, fluid dispenser 100 can then be returned to the tree branch or mounting hook where fluid container 4 moves downwards relative to valve rod 16 by gravity so that lower valve stopper 3 lifts off lower valve seat 13 to open it and so that upper valve stopper 5 seats in upper valve seat 19 to close it, thereby allowing fluid 30 to once again to flow from fluid container 4 into reservoir 1.

Referring to FIGS. 12 to 18, a second embodiment of fluid dispenser 100 is shown. In this embodiment, fluid dispenser 100 can be used as a fluid or water dispenser or fluid or water dish for birds and animals. In some embodiments, reservoir 1 can comprise pedestal 28 extending upwards from a bottom surface thereof wherein fluid container 4 comprises sleeve 29 extending downwardly therefrom such that sleeve 29 can slide onto pedestal 28. In some embodiments, valve rod 16 can further comprise rod guide 24 disposed at a lower end thereof wherein rod guide 24 can be configured to slide up and down within sleeve 29. In some embodiments, valve rod 16 can comprise upper loop end 26 disposed at an uppermost end thereof in place of hook 8, as shown in FIG. 1. In some embodiments, fluid dispenser 100 can comprise lift mechanism 27 configured to lift valve rod 16 upwards so that upper valve seat 19 is closed and lower valve seat 13 is open, thereby allowing fluid 30 to flow from fluid container 4 to flow through grooves 25 disposed in rod guide 24 and pedestal 28 and fill reservoir 1.

Figure 14:
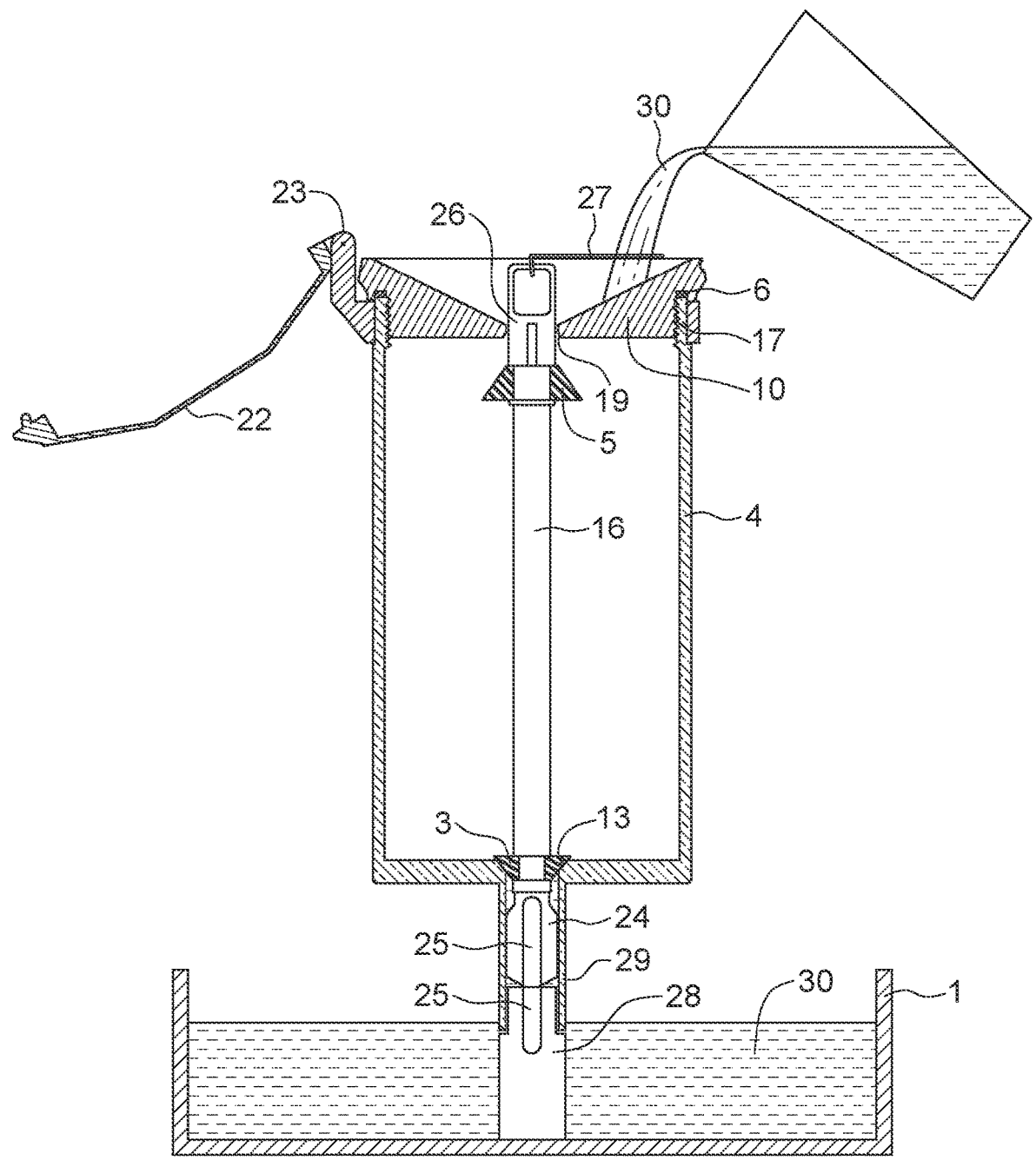
FIG. 14 is an elevation cross-section view depicting the fluid dispenser of FIG. 12 being filled with fluid.
Figure 15A:
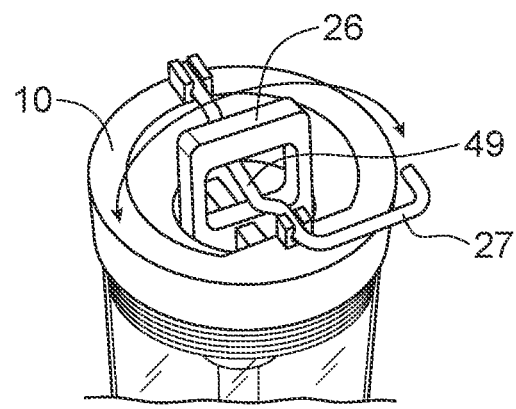
FIG. 15a is a perspective view depicting the inlet funnel of the fluid dispenser of FIG. 14.
Figure 15B:
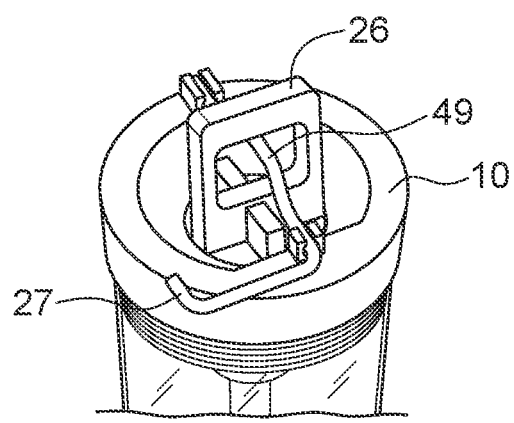
FIG. 15b is a perspective view depicting the inlet funnel of the fluid dispenser of FIG. 12.

To fill fluid dispenser 100, dust cover 22 can be rotated upwards via hinge 23 so that lift mechanism 27 can be manipulated to lower valve rod 16 to open upper valve seat 19 and close lower valve seat 13. In so doing, fluid 30 can then be poured into inlet funnel 10 and flow into fluid container 4, as shown in FIG. 14. Once filled, lift mechanism 27 can be manipulated to lift valve rod 16 to close upper valve seat 19 and open lower valve seat 13 to allow fluid 30 to once again flow from fluid container 4 into reservoir 1. Dust cover 22 can then be rotated via hinge 23 to close off inlet funnel 10. Referring to FIGS. 15a and 15b, in some embodiments, lift mechanism 27 can comprise a bent wire with hump 49 can raise up upper loop end 26, as shown in FIG. 15b, as well as lower loop end 26 by rotating the bent wire by 180 degrees causing hump 49 to turn downward thus causing valve rod 16 to move downwards.

Figure 12:
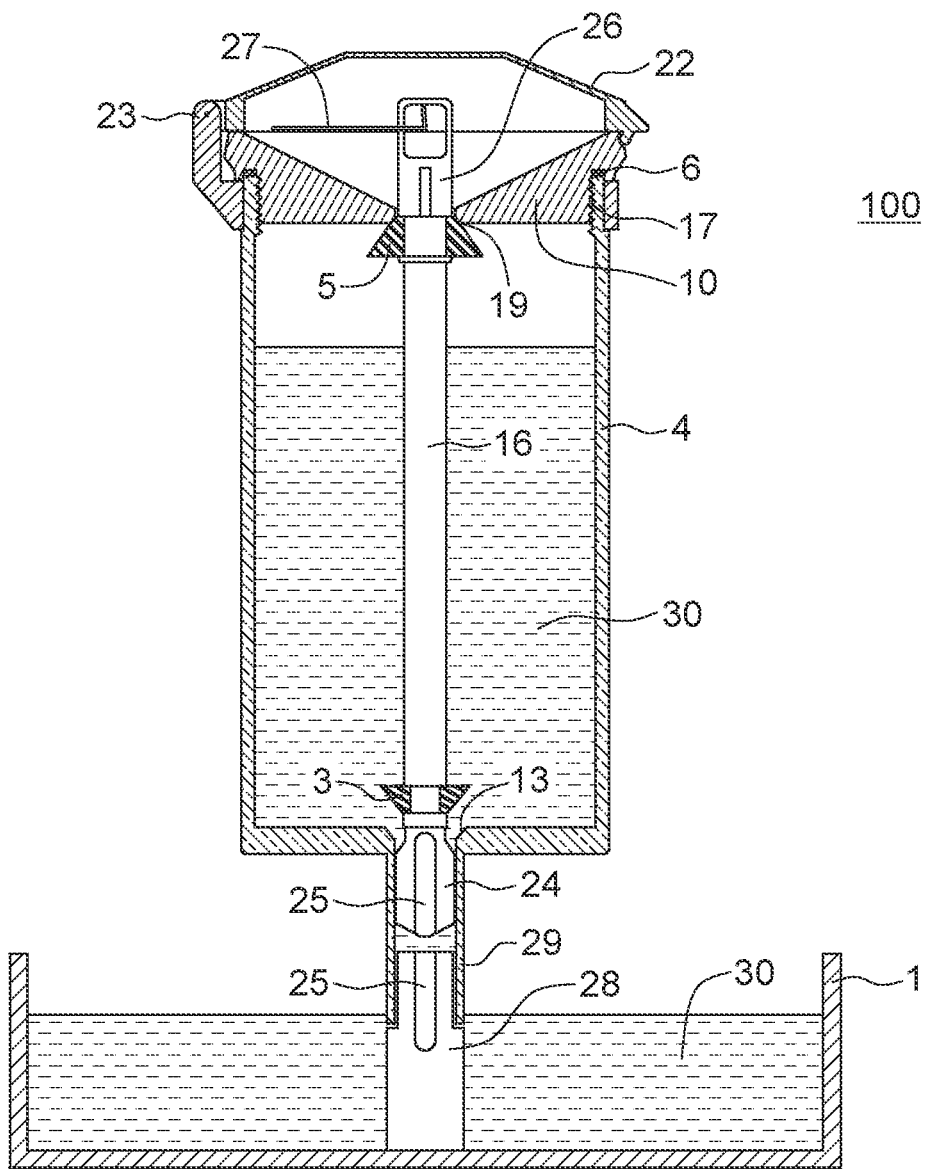
FIG. 12 is an elevation cross-section view depicting a second embodiment of a fluid dispenser.
Figure 13:
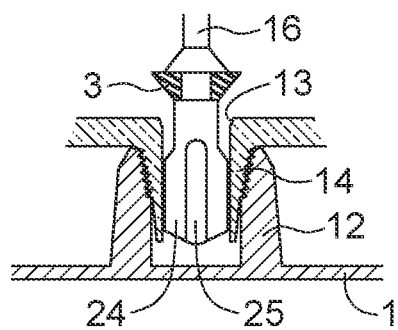
FIG. 13 is an elevation cross-section view depicting an alternate coupling arrangement for the fluid dispenser of FIG. 12.

Referring to FIG. 13, an alternate coupling arrangement is shown for the embodiment of fluid dispenser 100 shown in FIG. 12. In this alternate coupling arrangement, reservoir 1 can comprise coupler 12 such that lower fluid container coupler 14 can threadably attach thereto wherein rod guide 24 can slidably move up and down within coupler 14. Groove 25 disposed on rod guide 24 can allow fluid 30 from fluid container 4 to flow into reservoir 1.

Figure 16:
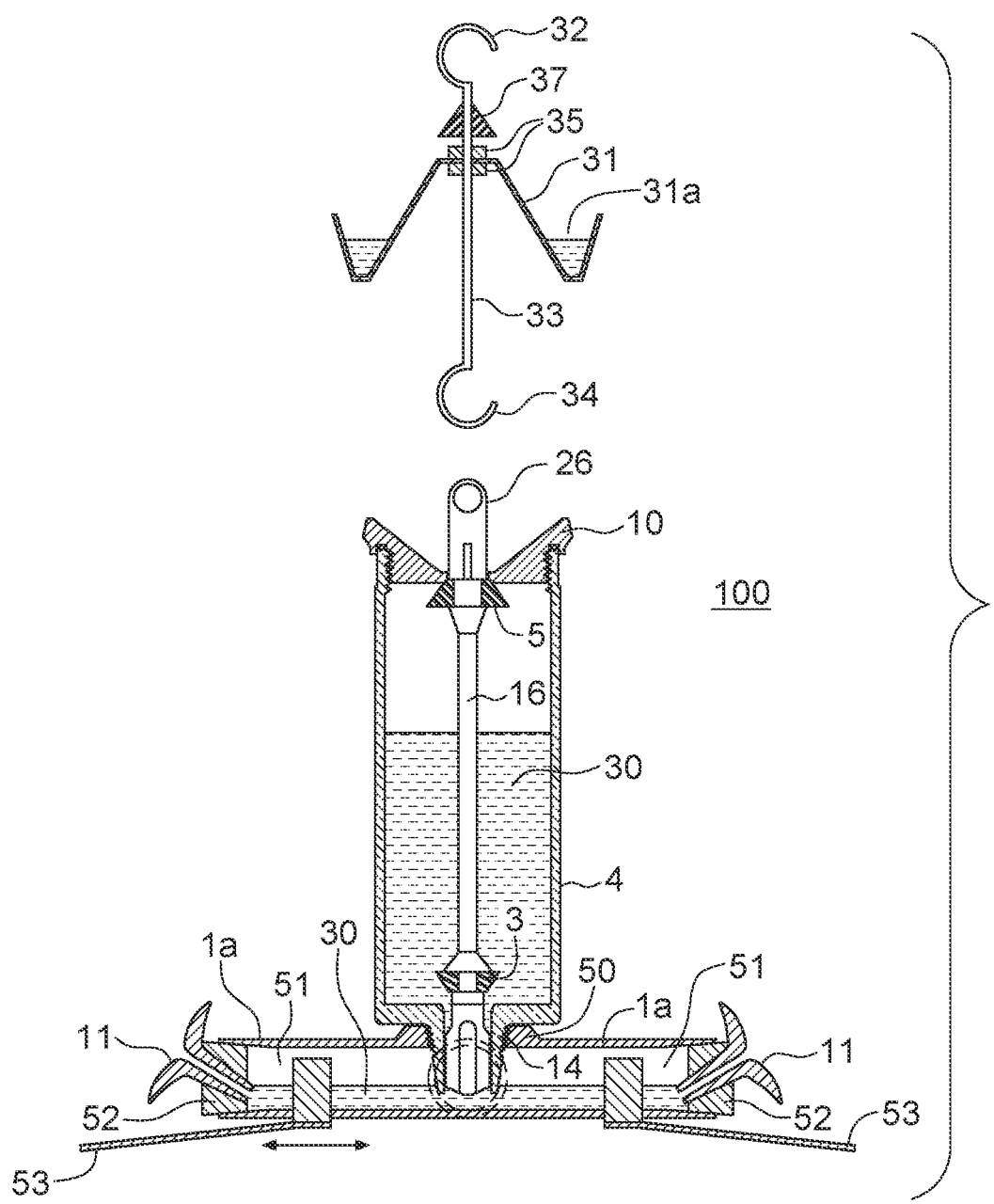
FIG. 16 is an elevation cross-section view depicting a third embodiment of a fluid dispenser.
Figure 17:
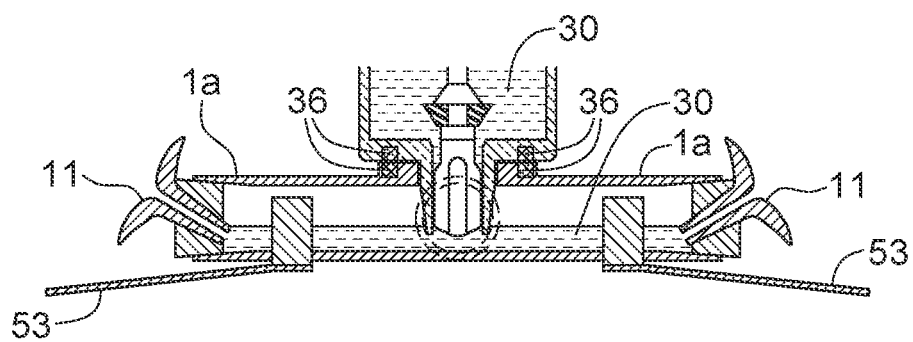
FIG. 17 is an elevation cross-section view depicting a first alternate reservoir for the fluid dispenser of FIG. 16.
Figure 18:
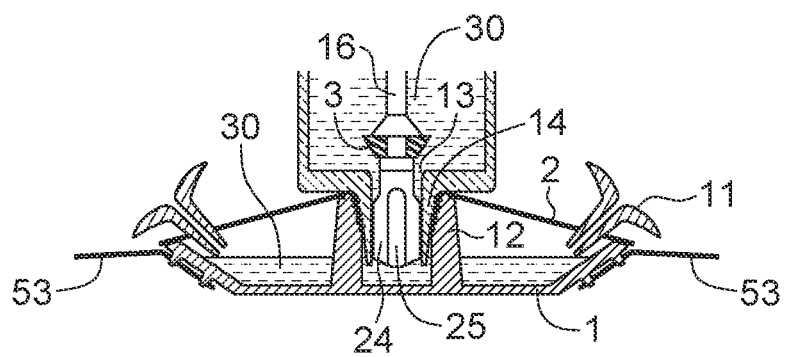
FIG. 18 is an elevation cross-section view depicting a second alternate reservoir for the fluid dispenser of FIG. 16.

Referring to FIG. 16, another embodiment of fluid dispenser 100 is shown further comprising an ant barrier assembly in place of dust cover 22. In some embodiments, fluid dispenser 100 can comprise hook rod 33 having lower hook 34 for attaching to loop end 26 and upper hook 32 for attaching to a tree branch or to a hook bracket mounted to a wall or a fence. Hook rod 33 can further comprise ant barrier 31 that can slide down hook rod 33 on top of inlet funnel 10 to close it off. Ant barrier 31 can further comprise an annular water barrier or "moat" 31a to prevent ants and other insects from entering fluid dispenser 100. Magnets 35 can be further disposed on hook rod 33 as means to hold ant barrier 31 in any position on hook rod 33 as ant barrier 31 is raised on hook rod 33 to provide access to fill fluid dispenser 100 with fluid 30 through inlet funnel 10. After filling fluid container 4 with fluid 30, ant barrier 31 can be slid down on hook rod 33 to close off inlet funnel 10. Hook rod 33 can also comprise rubber seal 37 disposed thereon to prevent rainwater from traveling down hook rod 33 into inlet funnel 10. In the embodiment shown in FIG. 16, fluid dispenser 100 comprises alternate reservoir 1a for holding fluid 30, which can comprise one or more tubes 51 having stoppers 52 with feeder ports 11 disposed thereon. In this embodiment, reservoir 1a comprises threaded coupler 50 threadably coupled to lower fluid container coupler 14. Referring to FIG. 17, instead of threaded coupler 50, fluid container 4 can be releasably coupled to reservoir 1a via a plurality of magnets 36 disposed on each. Referring to FIG. 18, another embodiment of fluid dispenser 100 is shown, further comprising a reservoir similar to reservoir 1 as shown in FIG. 1. In all of the embodiments shown in the figures and described in this description, fluid dispenser 100 can further comprise one or more perches 53 disposed near feeder ports 11 to allow birds to rest thereon when feeding or drinking through feeder ports 11.

Figure 19:
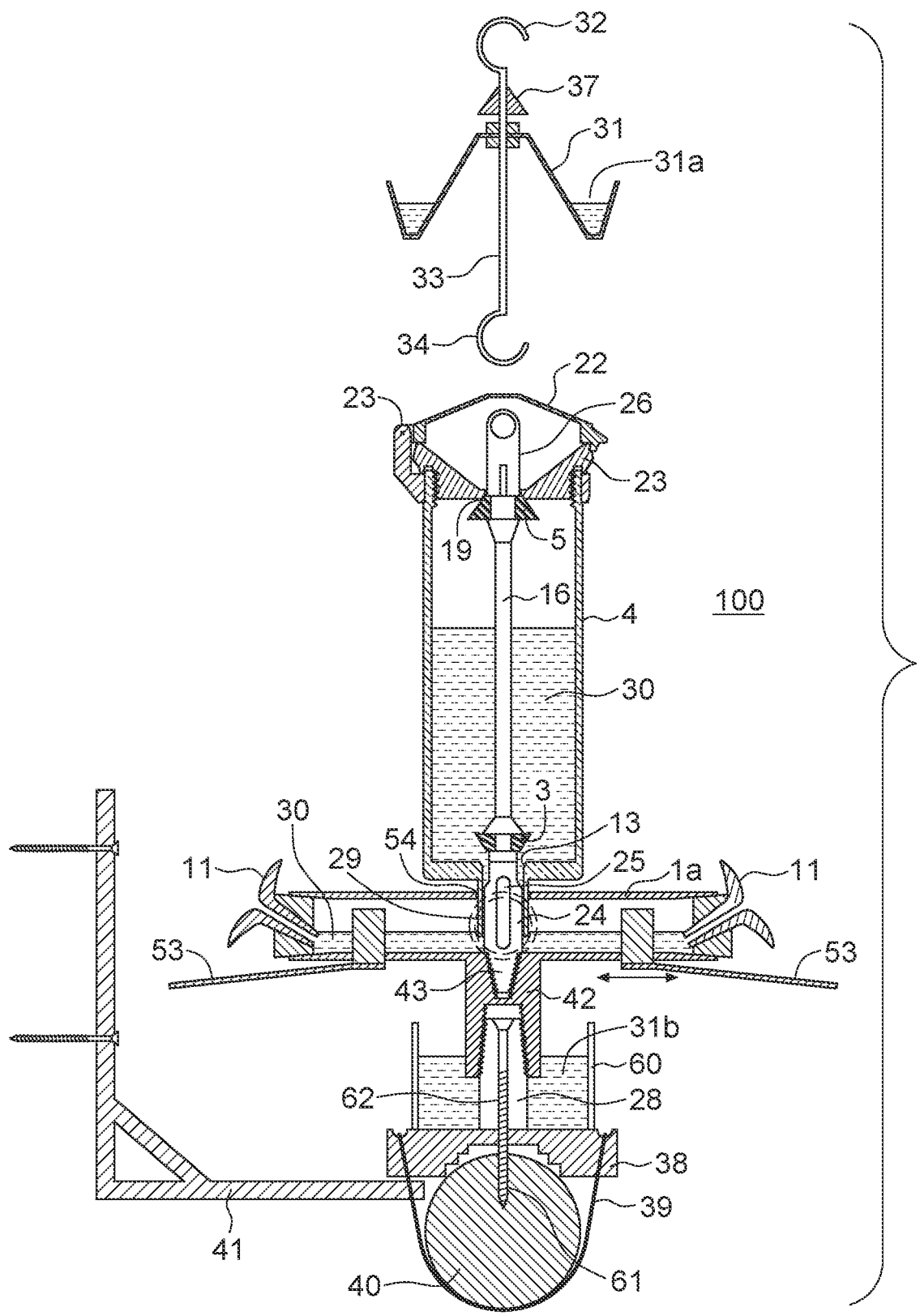
FIG. 19 is an elevation cross-section view depicting a third alternate reservoir for the fluid dispenser of FIG. 16.
Figure 20:
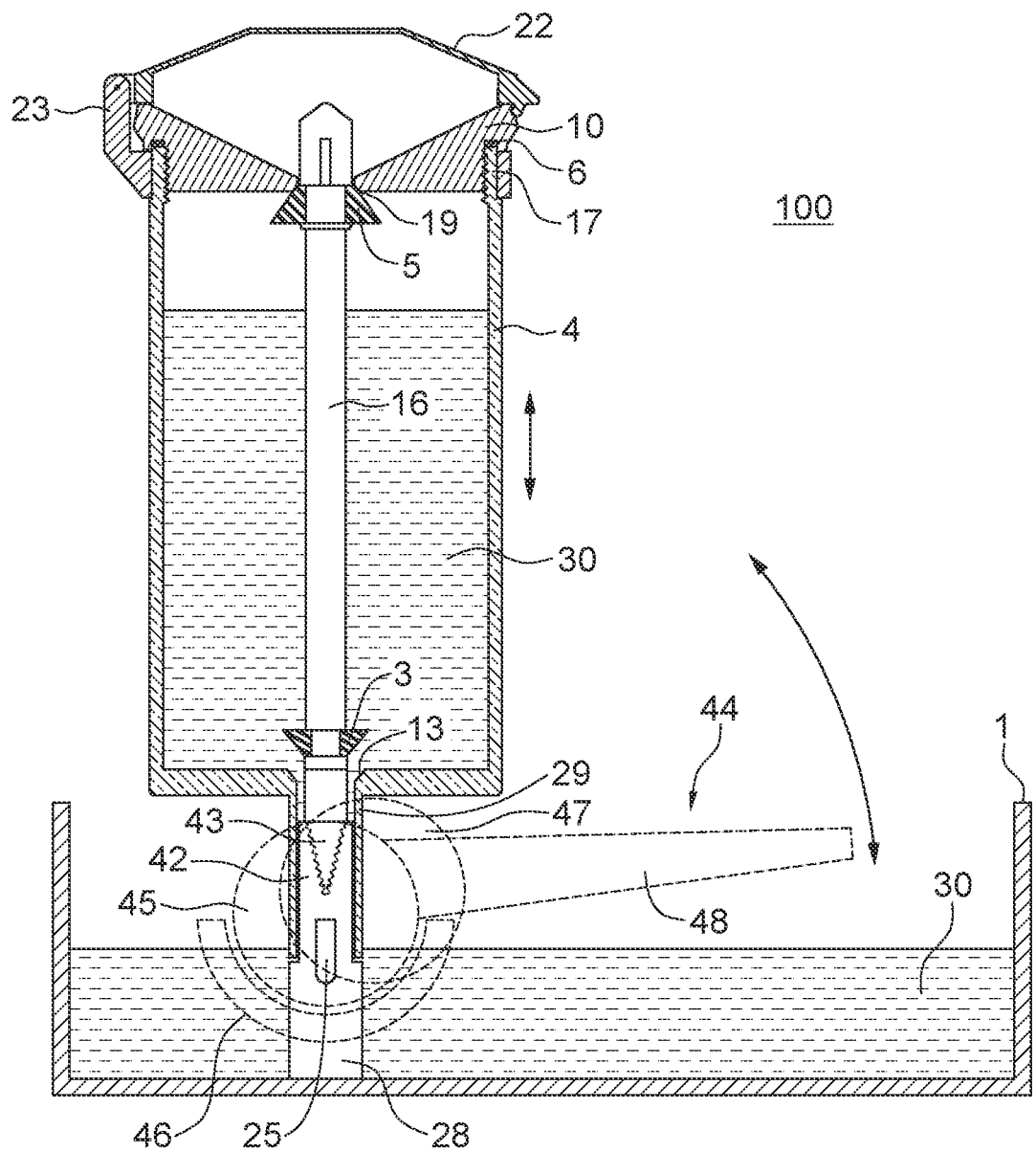
FIG. 20 is an elevation cross-section view depicting a third embodiment of a fluid dispenser.
Figure 21:
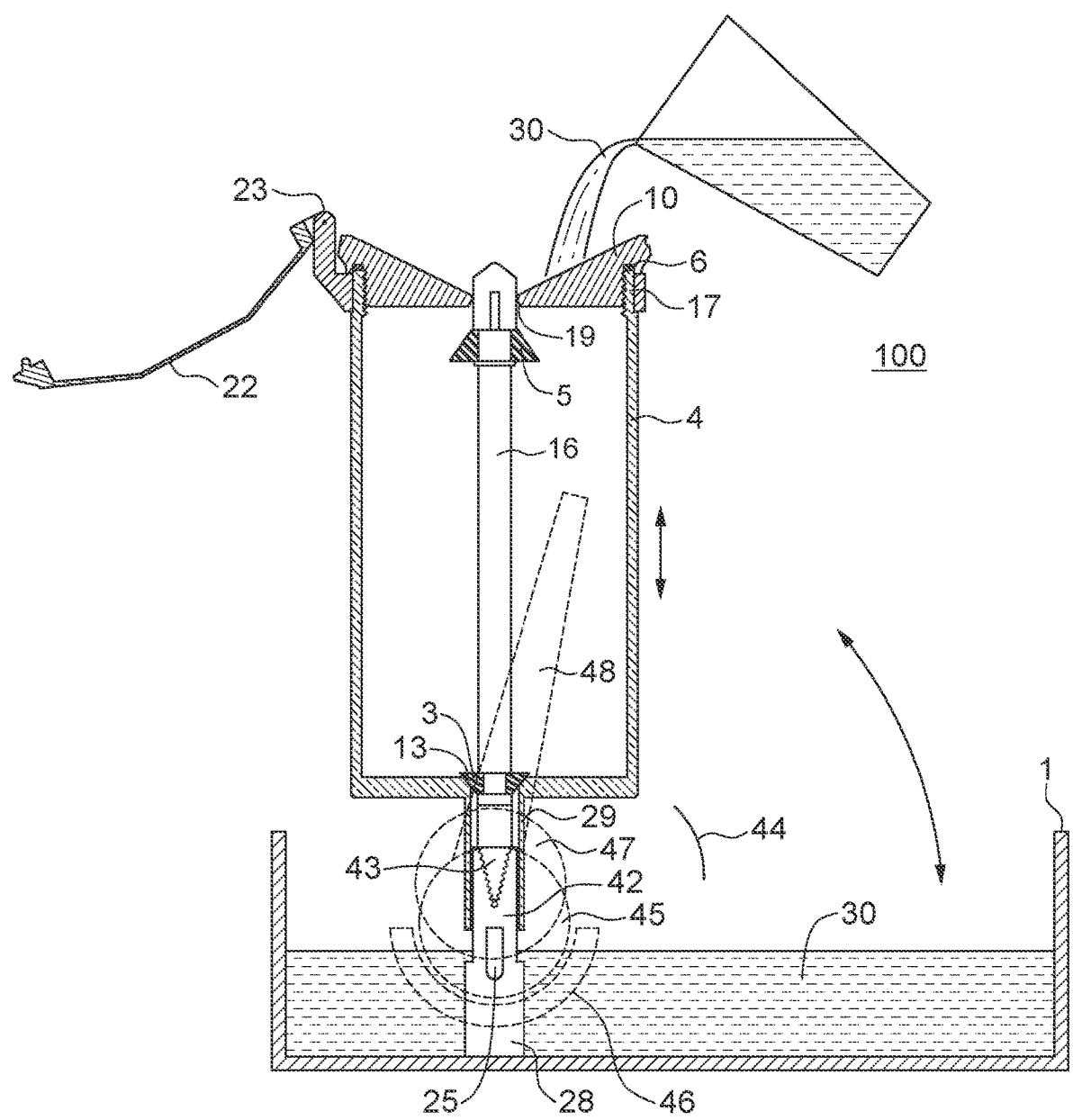
FIG. 21 is an elevation cross-section view depicting the fluid dispenser of FIG. 20 being filled with fluid.

Referring to FIGS. 19 to 21, a third embodiment of fluid dispenser 100 is shown. In this embodiment, valve rod 16 is fixed to a support structure and fluid container 4 can be configured to move or slide up and down relative to valve rod 16 to open and close upper and lower valve seats 13 and 19. Referring to FIG. 19, in some embodiments, fluid dispenser 100 can comprise base 38 configured to attachment to rail or bar 40 with a band or strap 39, wherein rail or bar 40 can attached to a wall via wall bracket 41. Base 38 can further comprise pedestal 28 disposed thereon wherein pedestal 28 can further coupled to valve rod stem 42 that can be configured to threadably couple with threaded end 43 of rod guide 24, which can be disposed at a lower end of valve rod 16. In some embodiments, valve rod stem 42 can be operatively couple to or integrated with reservoir 1a, as previously shown in FIG. 16. In some embodiments, reservoir 1a can comprise opening 54 configured to receive sleeve 29 of fluid container 4, wherein sleeve 29 can slide up and down relative to rod guide 24. In the illustrated embodiment, gravity can draw fluid container 4 downward thereby closing upper valve seat 19 with upper valve stopper 5 and opening lower valve seat 13 from lower valve stopper 3. Fluid 30 within fluid container 4 can flow downwards through grooves 25 disposed in guide rod 24 into reservoir 1a where it can be accessed by birds via feeder ports 11. In some embodiment, base 38 can comprise sidewall 60 to provide annular water barrier or moat 31b to act as an ant barrier to prevent ants from accessing fluid in fluid dispenser 100. To add fluid 30 to fluid dispenser 100, dust cover 22 can be lifted up and then fluid container 4 can be manually raised, causing sleeve 29 to move upwards in opening 54, to unseat upper valve stopper 5 from upper valve seat 19 and to close lower valve seat 13 with lower valve stopper 3. This can then put fluid dispenser 100 in a position where fluid 30 can be poured into inlet funnel 10 and enter fluid container 4. Once filled, fluid container 4 can be manually lowered to close off upper valve seat 19 and open lower valve seat 13 for fluid 30 to flow into reservoir 1a. Dust cover 22 can then be closed. In alternate embodiments, the ant barrier assembly described above and shown in FIG. 16 can be used to support the embodiment of fluid dispenser 100 shown in FIG. 19 in wherein hook 32 can attach to a tree branch or the like and hook 34 can attach to upper loop end 26 thereby suspending fluid dispenser 100.

Referring to FIGS. 20 and 21, an embodiment of fluid dispenser 100 is shown for use as a fluid or water dispenser/dish for birds and animals. In some embodiments, reservoir 1 can be larger than in previously described embodiments and comprise an open top. In some embodiments, reservoir 1 can comprise upwardly extending pedestal 28 further comprising valve rod stem 42 disposed on an upper end thereof, valve rod stem 42 configured to threadably couple with threaded end 43 of a lower end of valve rod 16. In some embodiments, sleeve 29 of fluid container 4 can be configured to slide onto valve rod stem 42 and, thus, be able to move up and down thereon. In the illustrated embodiment shown in FIG. 20, gravity can draw fluid container 4 downward thereby closing upper valve seat 19 with upper valve stopper 5 and opening lower valve seat 13 from lower valve stopper 3. Fluid 30 within fluid container 4 can flow downwards through grooves 25 disposed in pedestal 28 into reservoir 1. To add fluid 30 to fluid dispenser 100, dust cover 22 can be lifted up and then fluid container 4 can be manually raised with lift mechanism 44, causing sleeve 29 to move upwards on valve rod stem 42, to unseat upper valve stopper 5 from upper valve seat 19 and to close lower valve seat 13 with lower valve stopper 3. This can then put fluid dispenser 100 in a position where fluid 30 can be poured into inlet funnel 10 and enter fluid container 4, as shown in FIG. 21. In some embodiments, lift mechanism 44 can comprise of lift arm 48 operatively coupled to pivot wheel 45 disposed in wheel guide 46. Lift mechanism 44 can further comprise eccentric wheel 47 operatively coupled to pivot wheel 45. Lifting lift arm 48 can cause pivot wheel 45 to rotate within wheel guide 46 thereby causing eccentric wheel 47 to rise upwards and then fluid container 4 upwards. Once fluid dispenser 100 is filled, fluid container 4 can be manually lowered by lowering lift arm 48 to close off upper valve seat 19 and open lower valve seat 13 for fluid 30 to then flow into reservoir 1 via groove 25 disposed in pedestal 28. Dust cover 22 can then be closed.

Figure 22:
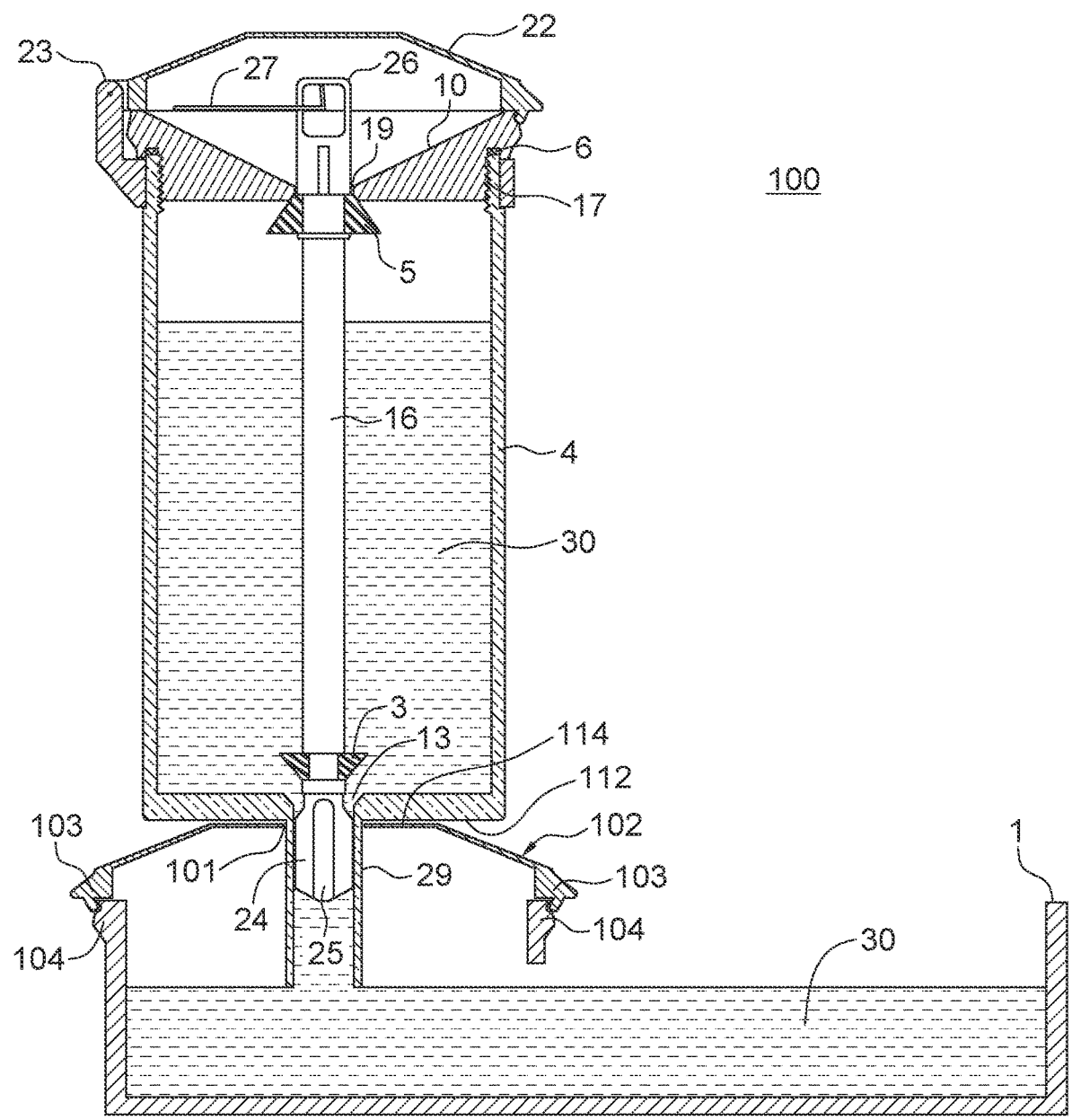
FIG. 22 is an elevation cross-section view depicting a fourth embodiment of a fluid dispenser.

Referring to FIG. 22, a fourth embodiment of fluid dispenser 100 is shown. In some embodiments, fluid dispenser 100 can comprise of fluid container 4 comprising bottom surface 112 further comprising sleeve 29 extending downwardly therefrom, wherein sleeve 29 can be inserted into opening 101 disposed through pedestal cap 102 such that bottom surface 112 can rest on top of top surface 114 of pedestal cap 102. Similar to previous embodiments described above, this embodiment of fluid dispenser 100 can comprise of inlet funnel 10 operatively coupled to container 4 via threaded coupling 17, with ring seal 6 disposed therebetween. In some embodiments, inlet funnel 10 can comprise dust cover 22 hingeably attached thereto via hinge 23.

In some embodiments, this embodiment of fluid dispenser 100 can comprise lift mechanism 27 as described above and shown in FIGS. 15a and 15b, can raise and lower loop end 26 and, thus, raise and lower valve rod 16 as described above. In some embodiments, valve rod 16 can comprise lower valve stopper 3 and upper valve stopper 5 that can seat in lower valve seat 13 and upper valve seat 19, respectively, and as described in previous embodiments above. In some embodiments, the lower end of valve rod 16 can comprise valve guide 24 disposed thereon to keep valve rod 16 disposed in sleeve 29. Valve guide 24 can further comprise grooves 25 thereon to allow fluid 30 to flow by, similar in operation of previous embodiments described above, such as shown in FIG. 14. In some embodiments, reservoir 1 can comprise pedestal neck 104 wherein pedestal cap 102 comprises lip 103 that can releasably attach to pedestal neck 104. The filling and operation of this embodiment of fluid dispenser 100 is similar to the embodiments described above.

Figure 23:
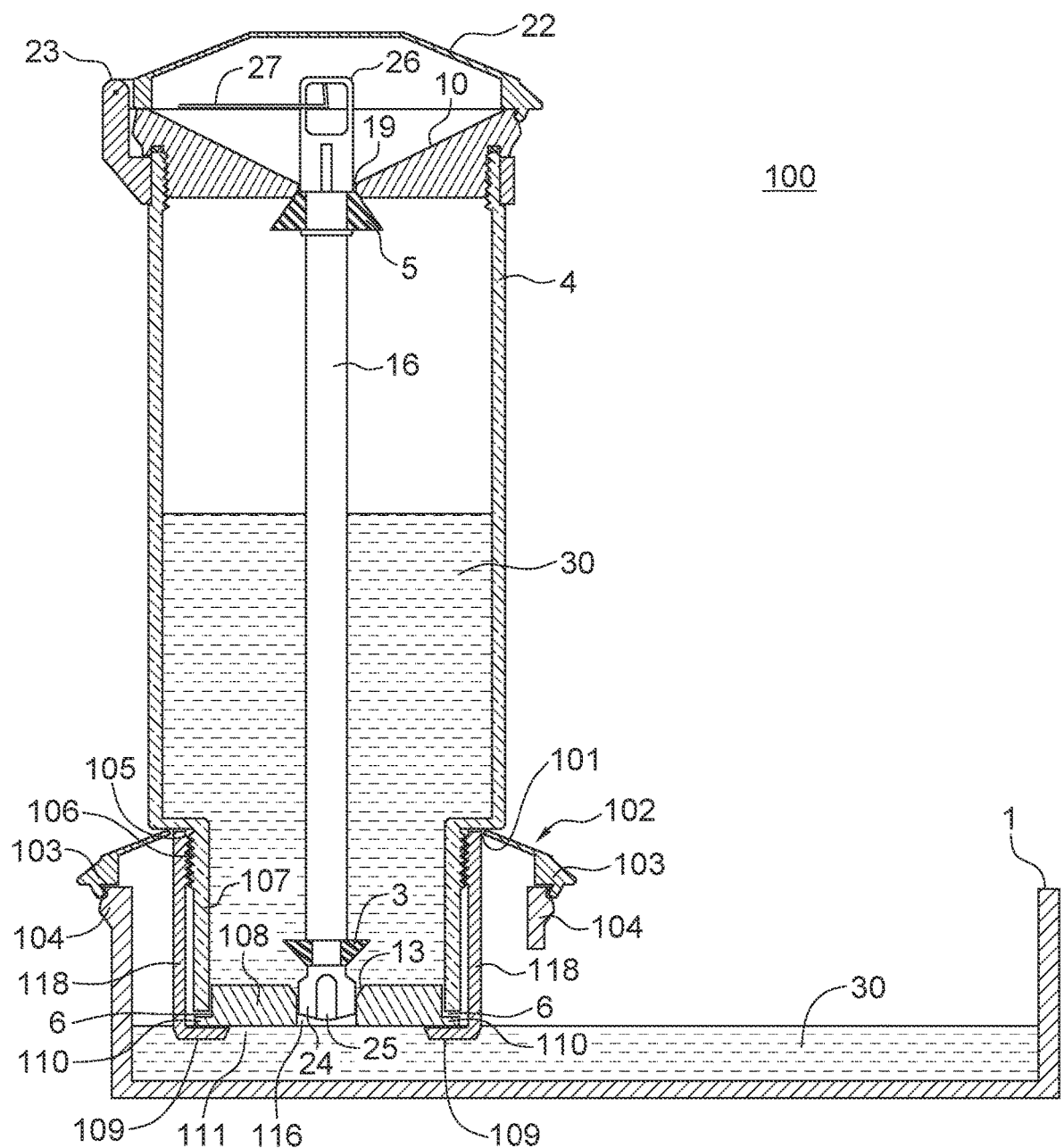
FIG. 23 is an elevation cross-section view depicting a fifth embodiment of a fluid dispenser.

Referring to FIG. 23, a fifth embodiment of fluid dispenser 100 is shown, which is an alternate arrangement of the fourth embodiment of fluid dispenser 100 as shown in FIG. 22. In this embodiment, container 4 can comprise narrowed neck 107 extending downwardly therefrom as shown in FIG. 23, wherein neck 107 can be inserted into opening 105 of tubular member 118 and can be threadably coupled thereto via threaded coupling 106. In some embodiments, tubular member 118 can comprise annular stop 109 disposed on a lower end thereof whereupon lower valve seat base 108 can be disposed thereon. In some embodiments, lower valve seat base 108 can comprise opening 116 disposed therethrough to receive rod guide 24, and can further comprise lower valve seat 13 to receive lower valve stopper 3. In some embodiments, lower valve seat base 108 can comprise base flange 110 extending therearound whereupon ring seal 6 can be placed. When neck 107 is inserted into opening 105 and threadably coupled thereto with threaded coupling 106, the lower end of neck 107 can contact ring seal 6 thereby sealing off the lower end of container 4. The combination of neck 107 threadably coupled to tubular member 118 can then be inserted through opening 101 so that it can rest on top of pedestal cap 102 as well as being removed from opening 101 such that container 4 can be refilled or to be serviced as needed. The filling of fluid 30 and operation of this embodiment of fluid dispenser 100 is similar to the embodiments described above.

Figure 24:
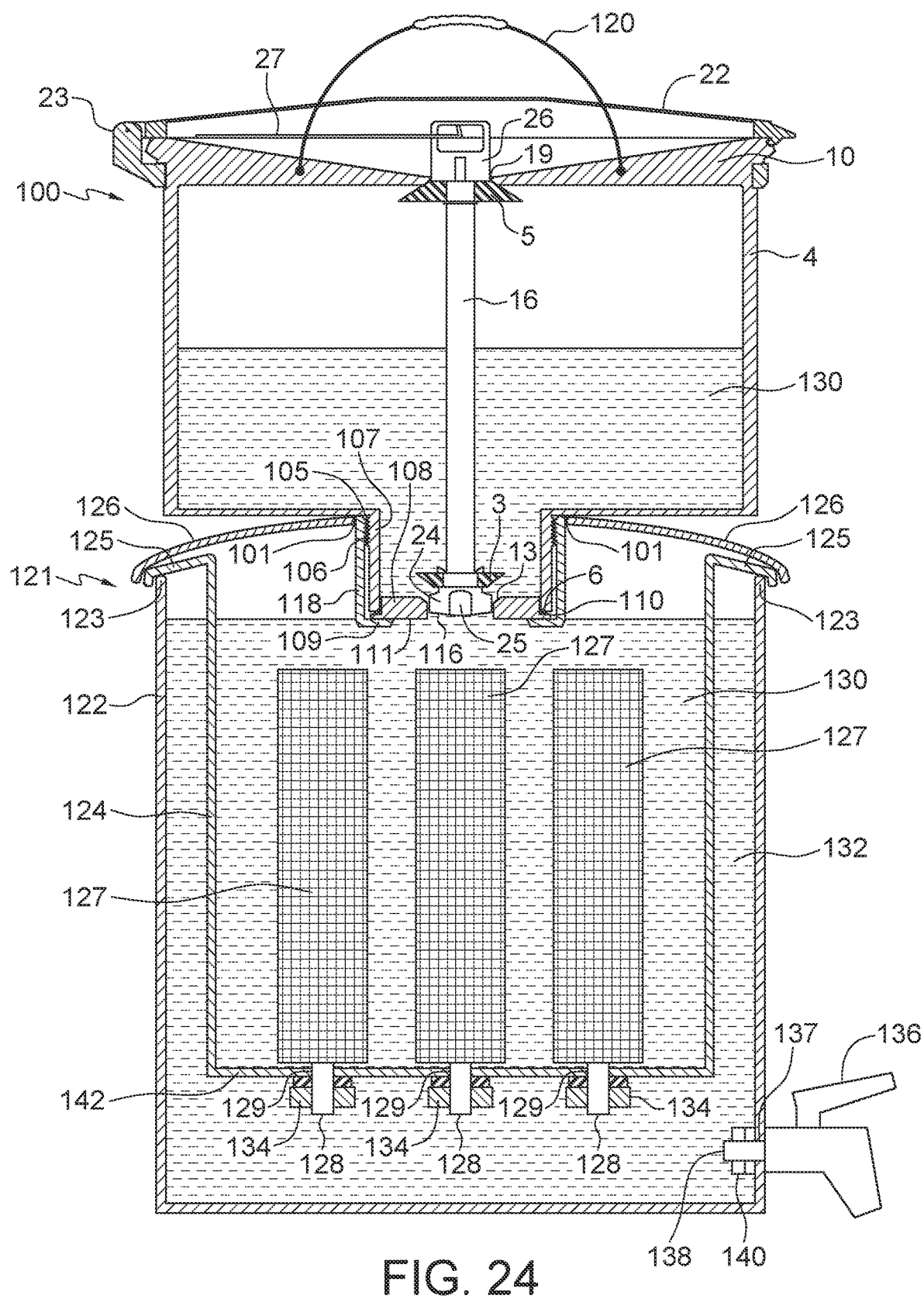
FIG. 24 is an elevation cross-section view depicting a fluid dispenser for use as a water purifier for human consumption.

Referring to FIG. 24, another embodiment of fluid dispenser 100 is shown for use for purifying water for human consumption, which is an alternate arrangement of the fifth embodiment of fluid dispenser 100 as shown in FIG. 23. In this embodiment, fluid dispenser 100 can be used with filtration container 121, which can further comprise of outer holding container 122, inner holding container 124 and lid 126. In some embodiments, inner holding container 124 can comprise flange 125 that can be configured to rest upon upper edge 123 of outer holding container 122 when inner holding container 124 is inserted therein. Lid 126 can be configured to be placed on top of flange 125. In some embodiments, inner holding container 124 can comprise one or more openings 129 disposed through bottom surface 142 thereof for attaching water filters 127 thereto. In some embodiments, water filter 127 can comprise of a Black Berry® charcoal ceramic filter as manufactured by Berkey Canada Inc. of Bowmanville, Ontario, Canada, wherein threaded nipple 128 of a water filter 127 can be inserted through each opening 129 and secured by locknut/washer 134. In some embodiments, outer holding container 122 can further comprise water spout 136 operatively coupled thereto. In some embodiments, water spout 136 can comprise threaded nipple 138 configured to inserted through opening 137 and secured with locknut/washer 140. In some embodiments, water spout 136 can comprise of a manually operated tap valve or spigot valve similar to those used to dispense water from a water jug or to drain fluid from a drum, cooler or tub, as well known to those skilled in the art.

In some embodiments, container 4 can comprise narrowed neck 107 extending downwardly therefrom as shown in FIG. 24, wherein neck 107 can be inserted into opening 105 of tubular member 118 and can be threadably coupled thereto via threaded coupling 106. In some embodiments, tubular member 118 can comprise annular stop 109 disposed on a lower end thereof whereupon lower valve seat base 108 can be disposed thereon. In some embodiments, lower valve seat base 108 can comprise opening 116 disposed therethrough to receive rod guide 24, and can further comprise lower valve seat 13 to receive lower valve stopper 3. In some embodiments, lower valve seat base 108 can comprise base flange 110 extending therearound whereupon ring seal 6 can be placed. When neck 107 is inserted into opening 105 and threadably coupled thereto with threaded coupling 106, the lower end of neck 107 can contact ring seal 6 thereby sealing off the lower end of container 4. The combination of neck 107 threadably coupled to tubular member 118 can then be inserted through opening 101 so that it can rest on top of lid 126 as well as being removed from opening 101 such that container 4 can be refilled or to be serviced as needed. In some embodiments, fluid dispenser 100 can comprise of handle 120 operatively attached thereto to enable a user to pick up and carry fluid dispenser 100 to a source of unpurified water 130, such as a river, a lake and the like, to be filled with unpurified water 130. Prior to lifting handle 120, lift mechanism 27 can be operated to lower valve rod 16 to lower valve stopper 3 into lower valve seat 13 thereby enabling container 4 to be lifted by handle 120 and carried to the source of unpurified water 130 and filled therewith in a manner similar to the embodiments described above. Once filled with unpurified water 130, the combination of neck 107 threadably coupled to tubular member 118 can be inserted back into opening 101 and rest on top of lid 126. Then, lift mechanism 27 can be manipulated to raise valve rod 16 to raise lower valve stopper 3 from lower valve seat 13 and allow unpurified water 130 to pass therethrough and through opening 116 to enter inner holding container 124. Once in inner holding container 124, unpurified water 130 can enter and pass through water filter 127 and exit through threaded nipple 128 as purified water 132 into outer holding container 122, wherein purified water 132 can be drawn therefrom by opening or operating water spout 136 so that the drawn water can be used for human consumption.

Although a few embodiments have been shown and described, it will be appreciated by those skilled in the art that various changes and modifications can be made to these embodiments without changing or departing from their scope, intent or functionality. The terms and expressions used in the preceding specification have been used herein as terms of description and not of limitation, and there is no intention in the use of such terms and expressions of excluding equivalents of the features shown and described or portions thereof, it being recognized that the invention is defined and limited only by the claims that follow.

I claim:
1. A fluid dispenser, comprising:
  a) a fluid container comprising an upper opening and a lower opening;
  b) an upper valve seat disposed in the fluid container adjacent the upper opening;
  c) a lower valve seat disposed in the fluid container adjacent the lower opening, wherein the upper and lower valve seats are disposed a first predetermined distance apart;
  d) a valve rod disposed in the fluid container, the valve rod comprising an upper valve stopper disposed thereon, the upper valve stopper configured to seat in the upper valve seat, and wherein the valve rod further comprises a lower valve stopper disposed thereon, the lower valve stopper configured to seat in the lower valve seat, wherein the upper and lower valve stoppers are disposed a second predetermined distance apart, and wherein the second predetermined distance is less than the first predetermined distance;
  e) a reservoir operatively coupled to the lower opening of the fluid container; and
  f) wherein raising the valve rod relative to the fluid container, or lowering the fluid container relative to the valve rod, causes the upper valve stopper to seat in the upper valve seat, and when lowering the valve rod relative to the fluid container, or raising the fluid container relative to the valve rod, causes the lower valve stopper to seat in the lower valve seat.

2. The fluid dispenser as set forth in claim 1, further comprising an inlet funnel operatively coupled to the upper opening, the inlet funnel further comprising the upper valve seat.

3. The fluid dispenser as set forth in claim 2, wherein the inlet funnel is threadably coupled to the fluid container.

4. The fluid dispenser as set forth in claim 2, further comprising an inlet funnel cover disposed on the inlet funnel, the inlet funnel cover further comprising a inlet port disposed therethrough and a flap hingeably attached to the inlet funnel cover, the flap configured to cover the inlet port and to lift up to provide access to the inlet port.

5. The fluid dispenser as set forth in claim 2, further comprising a dust cover hingeably attached to the inlet funnel.

6. The fluid dispenser as set forth in claim 5, further comprising a control mechanism configured to move the valve rod between a first position where the upper valve stopper is seated in the upper valve seat and a second position where the lower valve stopper is seated in the lower valve seat.

7. The fluid dispenser as set forth in claim 1, further configured for the reservoir to be threadably attached to the fluid container, the reservoir further configured for communication with the fluid container.

8. The fluid dispenser as set forth in claim 7, further comprising a reservoir cover configured to cover the reservoir, the reservoir configured to be retained in place when the reservoir is threadably attached to the fluid container, the reservoir cover further comprising at least one aperture disposed therethrough to provide access to the reservoir by an animal or a bird.

9. The fluid dispenser as set forth in claim 2, wherein the valve rod further comprises a hook disposed on an upper end thereof.

10. The fluid dispenser as set forth in claim 9, wherein the valve rod further comprises a cover slidably attached thereto, the cover configured to cover the inlet funnel.

11. The fluid dispenser as set forth in claim 10, wherein the cover further comprises an ant barrier.

12. The fluid dispenser as set forth in claim 2, wherein the reservoir comprises a valve rod stem, wherein the valve rod is operatively coupled to the valve rod stem, and wherein the fluid container is slidably disposed on the valve rod stem, the valve rod stem configured to provide communication between the fluid container and the reservoir.

13. The fluid dispenser as set forth in claim 12, further comprising a lift mechanism configured to move the fluid container between a first position where the upper valve stopper is seated in the upper valve seat and a second position where the lower valve stopper is seated in the lower valve seat.

14. The fluid dispenser as set forth in claim 13, wherein the lift mechanism comprises a lifting arm operatively coupled to an eccentric wheel configured to raise and lower the fluid container on the valve rod stem when the lifting arm is raised and lowered.

15. The fluid dispenser as set forth in claim 12, further comprising a dust cover hingeably attached to the inlet funnel.

16. The fluid dispenser as set forth in claim 1, wherein the reservoir further comprises a filtration container.

17. The fluid dispenser as set forth in claim 16, wherein the filtration container comprises:
   a) an outer holding container comprising an upper edge;
   b) an inner holding container configured to be disposed within the outer holding container, the inner holding container comprising a flange configured to be disposed on top of the upper edge;
   c) at least one water filter disposed in the inner holding container, the at least one water filter configured to provide fluid communication from the inner holding container to the outer holding container; and
   d) a lid configured to be disposed on top of the flange, the lid further configured to operatively couple to the lower opening of the fluid container.

18. The fluid dispenser as set forth in claim 17, wherein the at least one water filter comprises a charcoal water filter.

19. The fluid dispenser as set forth in claim 17, wherein the at least one water filter is configured can be releasably attached to the inner holding container.

20. The fluid dispenser as set forth in claim 17, further comprising a water spout operatively coupled to the outer holding container, the water spout configured to provide fluid communication to the outer holding container.

* * * * *